(12) United States Patent
Porikli (10) Patent No.: US 7,454,058 B2
(45) Date of Patent: Nov. 18, 2008

(54) METHOD OF EXTRACTING AND SEARCHING INTEGRAL HISTOGRAMS OF DATA SAMPLES

(75) Inventor: Fatih M. Porikli, Watertown, MA (US)

(73) Assignee: Mitsubishi Electric Research Lab, Inc., Cambridge, MA (US)

( * ) Notice: Subject to any disclaimer, the term of this patent is extended or adjusted under 35 U.S.C. 154(b) by 825 days.

(21) Appl. No.: 11/052,598

(22) Filed: Feb. 7, 2005

(65) Prior Publication Data

US 2006/0177131 A1 Aug. 10, 2006

(51) Int. Cl.
*G06K 9/00* (2006.01)
*G06K 9/46* (2006.01)
*G06K 9/36* (2006.01)
(52) U.S. Cl. ....................... 382/168; 382/190
(58) Field of Classification Search ................ 382/162, 382/164, 165, 168, 173, 190, 240, 284; 358/515, 358/518, 520, 530; 345/589, 600–604
See application file for complete search history.

(56) References Cited

U.S. PATENT DOCUMENTS

| | | | | |
|---|---|---|---|---|
| 6,411,730 | B1 * | 6/2002 | Bartell et al. | 382/168 |
| 6,621,926 | B1 * | 9/2003 | Yoon et al. | 382/168 |
| 7,003,153 | B1 * | 2/2006 | Kerofsky | 382/168 |
| 7,006,688 | B2 * | 2/2006 | Zaklika et al. | 382/165 |
| 7,013,044 | B2 * | 3/2006 | Wang | 382/168 |
| 7,016,534 | B2 * | 3/2006 | Fukawa et al. | 382/168 |
| 7,020,329 | B2 * | 3/2006 | Prempraneerach et al. | 382/164 |
| 7,028,271 | B2 * | 4/2006 | Matsugu et al. | 716/1 |
| 7,039,229 | B2 * | 5/2006 | Lin et al. | 382/165 |
| 7,058,220 | B2 * | 6/2006 | Obrador | 382/168 |
| 7,062,083 | B2 * | 6/2006 | Lim et al. | 382/164 |
| 2006/0177131 | A1 * | 8/2006 | Porikli | 382/168 |
| 2007/0133878 | A1 * | 6/2007 | Porikli et al. | 382/190 |

OTHER PUBLICATIONS

C. Papageorgiou, M. Oren, and T. Poggio. A general framework for object detection, In Proceedings of ICCV, 1998.
S. Ruiz-Correa, L. G. Shapiro, and M. Meila, "A new paradigm for recognizing 3-D object shapes from range data", In Proceedings of CVPR, 2003.
D. Comaniciu, V. Ramesh, and P. Meer, "Real-time tracking of non-rigid objects using mean shift", In Proceedings of CVPR, 2000.
J.Mathew, P. Coddington and K. Hawick, "Analysis and development of java grande benchmarks", In Proceedings of ACM, 1999.
C. Carson, M. Thomas, S. Belongie, J.M. Hellerstein, and J. Malik, "Blobworld: A system for region-based image indexing and retrieval", In Proceedings of ICVS, 1999.
J. Huang, S. Kumar, M. Mitra, W.J. Zhu, and R. Zabih, "Image indexing using color correlograms", In Proceedings of CVPR, 1997.

\* cited by examiner

*Primary Examiner*—Amir Alavi
(74) *Attorney, Agent, or Firm*—Dirk Brinkman; Clifton D. Mueller; Gene Vinokur (57) ABSTRACT

A computer implemented method extracts an integral histogram from sampled data, such as time series data, images, and volumetric data. First, a set of samples is acquired from a real-world signal. The set of samples is scanned in a predetermined order. For each current sample, an integral histogram integrating a histogram of the current sample and integral histograms of previously scanned samples is constructed.

19 Claims, 12 Drawing Sheets

Prior Art
100
Fig. 1 for each *possible scale* do for each *possible point* do for each *target point* do { *GetCurrentValue* / *FindBin* / *GetBinValue* / *IncreaseBinValue* } for each *bin* do { *Normalize* }

*ComputeHistogramDistance*

Prior Art
200
*Fig. 2* for each *possible point*
  do $\begin{cases} \textbf{for each } \textit{target point} \\ \quad \textbf{do } \{ PropagateIntegral \\ \quad GetCurrentValue \\ \quad FindBin \\ \quad GetBinValue \\ \quad IncreaseBinValue \end{cases}$ for each *possible scale*
  do $\begin{cases} \textbf{for each } \textit{possible point } p \in D \\ \quad \textbf{for each } \textit{bin} \\ \quad \quad \textbf{do } \begin{cases} ComputeIntersection \\ Normalize \\ ComputeHistogramDistance \end{cases} \end{cases}$

METHOD OF EXTRACTING AND SEARCHING INTEGRAL HISTOGRAMS OF DATA SAMPLES

FIELD OF THE INVENTION

The invention relates generally to representing and searching data samples of real-world signals, and more particularly to representing and searching with histograms extracted from the data samples to detect objects.

BACKGROUND OF THE INVENTION

Figure 1:
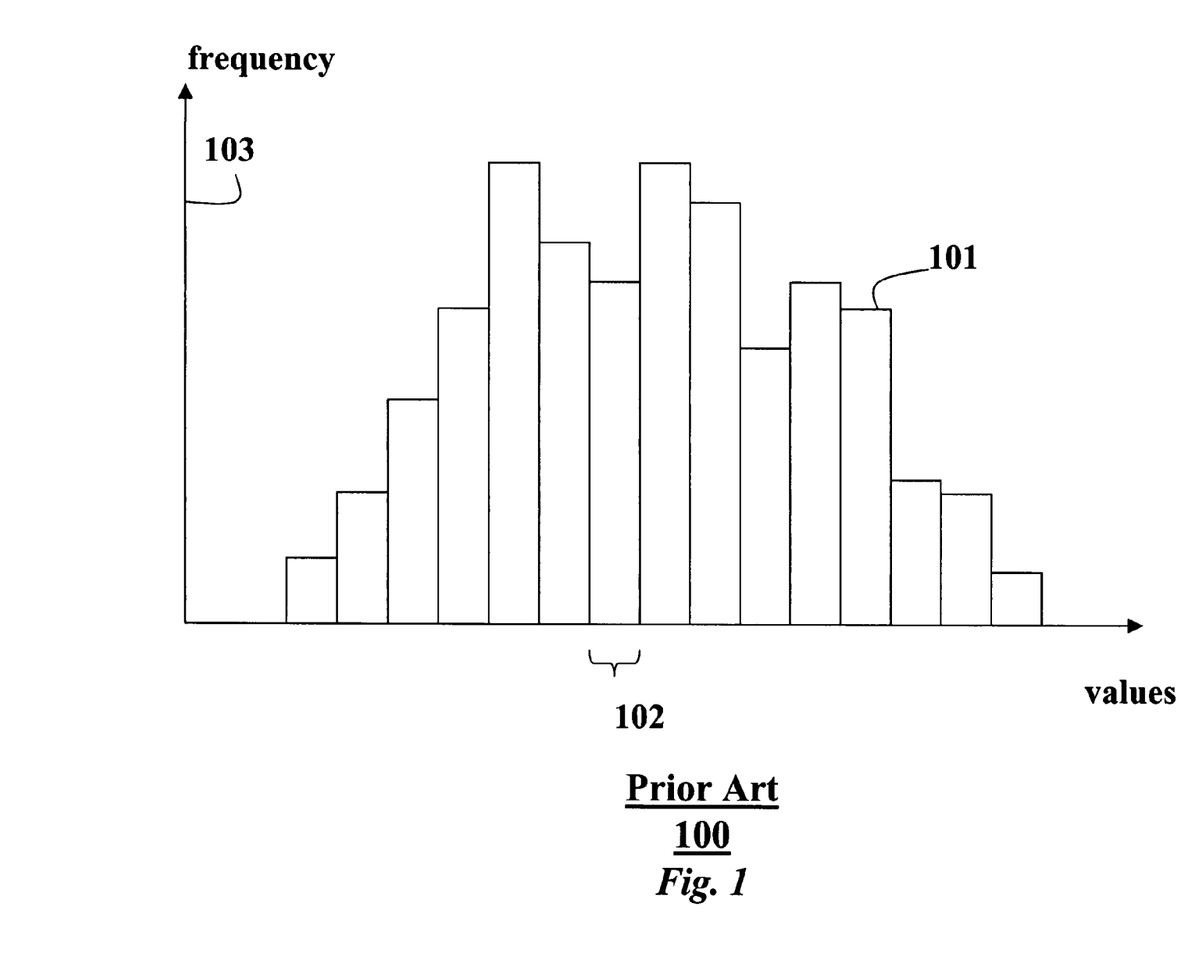
FIG. 1 is a prior art histogram.

As shown in FIG. 1, a histogram 100 is an array of 'bins' 101. Each bin corresponds to a range 102 of values of a sampled data set. The bin 'counts' the frequency 103 of occurrences of sample values in a particular range. In other words, the histogram represents a frequency distribution of the samples in the data set.

For example, a histogram of a sampled color image 'counts' the number of pixels that have the same color values in each bin. Thus, the histogram is a mapping from the sampled data set to a set of non-negative real numbers +R.

From a probabilistic point of view, a normalization of the histogram results in a discrete function that resembles a probability density function of the data set. Histograms can be used to determine statistical properties of the data set, such as distribution, spread, and outliers.

Histograms are used in many computer vision applications, such as object based indexing and retrieval, C. Carson, M. Thomas, S. Belongie, J. M. Hellerstein, and J. Malik, "Blobworld: A system for region-based image indexing and retrieval", *Proceedings of ICVS*, 1999 and J. Huang, S. Kumar, M. Mitra, W. J. Zhu, and R. Zabih, "Image indexing using color correlograms", *Proceedings of CVPR*, 1997; image segmentation, D. A. Forsyth and J. Ponce. "Computer Vision: A Modem Approach", *Prentice Hall*, 2002 and S. Ruiz-Correa, L. G. Shapiro, and M. Meila, "A new paradigm for recognizing 3-D object shapes from range data", *Proceedings of CVPR*, 2003; object detection, C. Papageorgiou, M. Oren, and T. Poggio, "A general framework for object detection," *Proceedings of ICCV*, 1998; and object tracking, D. Comaniciu, V. Ramesh, and P. Meer, "Real-time tracking of nonrigid objects using mean shift," *Proceedings of CVPR*, 2000.

A face detector is described by P. Viola and M. Jones, "Robust real-time face detection", *Proceedings of ICCV*, page II: 747, 2001. As described by Viola et al., it is possible determine the sum of the intensity values within rectangular windows scanned over an image in linear time without repeating the summation operator for each possible window. For each rectangular sum, a constant number of operations is required to determine the sums over distinct rectangles multiple times. This defines a cumulative or integral intensity image, where each pixel holds the sum of all values to the left of and above the pixel including the value of the pixel itself. The integral intensity image can be determined for the entire image with only four arithmetic operations per pixel. One starts the scan with the window in the top left corner pixel of the image, going first to the right and then down. A function determines the value of the current pixel in the integral image to be the sum of all pixel intensities above and to the left of the current pixel minus the pixel values to the upper left. The sum of an image function in a rectangle can be determined with another four arithmetic operations with appropriate modifications at the border. Thus, with a linear amount of operations, the sum of the image functions over any rectangle can be determined in linear time to construct the integral image.

Unfortunately, it is time consuming to extract and search conventional histograms. Only an exhaustive search can provide a global optimum. Sub-optimal searches, such as a gradient descent and application specific constraints can accelerate the search. However, computer vision applications that rely on the optimal solutions, such as object detection and tracking, demand a theoretical breakthrough in histogram extraction.

Conventionally, an exhaustive search is required to measure all distances between a particular histogram and histograms of all possible target regions. This process requires generation of histograms for the regions centered at every possible point, e.g., pixels. In cases where the search is performed at different scales, i.e., different target region scale (sizes), the process is repeated as many times as the number of scales.

Figure 2:
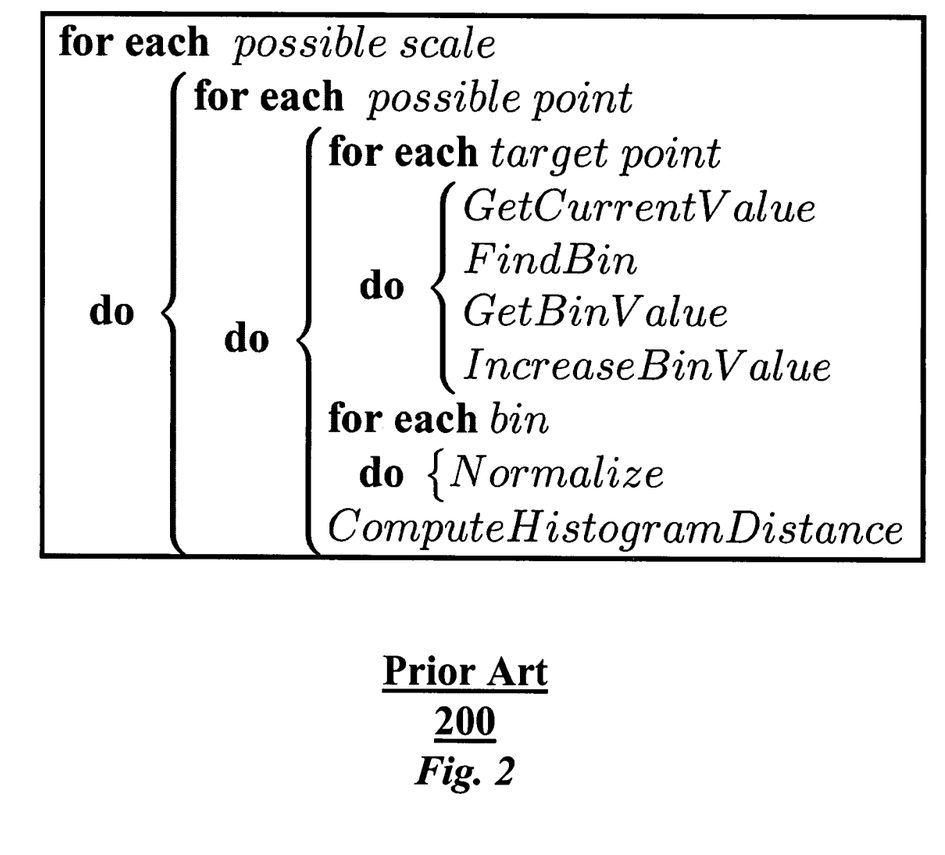
FIG. 2 is a pseudocode of a prior art histogram extraction method.

FIG. 2 shows the pseudocode 200 of a conventional histogram search.

Up to now, this conventional approach is the only known solution that guarantees finding a global optimum for a histogram-based search.

It is desired to improve the speed of histogram extraction and searching histograms by several orders of magnitude.

SUMMARY OF THE INVENTION

The invention provides a method for extracting integral histograms from possible target regions in a Cartesian sampled data space, and to search the extracted histograms.

The invention exploits the spatial arrangement of data points, and recursively propagates an aggregated histogram by starting from an origin and scanning through the remaining points along a predetermined scan-line. The histogram of a rectangular region is determined by intersecting the integral histogram at four corner points. At each step, a single bin is updated using the values of the integral histogram at the previously processed neighboring points. After the integral histogram is propagated, the histogram of any target region can be constructed using just a small number of simple arithmetic operations.

The method according to the invention has three distinct advantages. The method is extremely fast when compared to conventional approaches. The method can employ an exhaustive search process in real-time, which has been impractical up to now for most complex vision applications. The method can be extended to higher data dimensions, uniform and non-uniform bin formations, and multiple target scales without sacrificing its advantages. The method also enables a description of higher-level histogram features that enable integration of spatial information within the histogram.

Numerical analysis with different number of bins, data dimensions, and data structures proves that the integral histogram method according to the invention drastically decreases the number of required operations.

The method can be used to detect objects in a video in real-time.

DETAILED DESCRIPTION OF THE PREFERRED EMBODIMENT

Integral Histogram

An integral histogram according to the invention is extracted from sampled data by a recursive propagation method. The method works in Cartesian spaces. The method can be extended into any dimensional data space and any tensor representations.

A function $f$ such as $x \to f(x)$, is a defined in a d-dimensional real valued Cartesian space $\Re^d$, where $x=[x_1, \ldots, x_d]$ are sample points in the space. The function $f$ maps to a k-dimensional tensor, i.e., $f(x)=[g_1, \ldots, g_k]$. The d-dimensional data space is bounded within a range $N_1, \ldots, N_d$, i.e., $0 \leq x_i \leq N_i$.

An integral histogram $H(x, b)$ is defined along a scanline of points $x_0, x_1, \ldots$, such that:

$$H(x, b) = \bigcup_{p=0}^{x} Q(f(p)), \quad (1)$$

where $Q(.)$ gives the corresponding bin of a current point, and $\cup$ is the union operator that is defined as follows.

The value of the bin b of the histogram $H(x, b)$ is equal to the sum of bin values of previously scanned points of the histogram, i.e., the sum of all $Q(f(p))$, while $p<x$. In other words, $H(x, b)$ is the histogram of a larger Cartesian region 'between' the origin and a current point, and $0 \leq p_1 \leq x_1$, $0 \leq p_2 \leq x_2, \ldots$, etc.

Note that $H(N, b)$ is equal to the histogram of all data points in the space, because $N=[N_1, \ldots, N_d]$ is the boundary of the space.

Therefore, the integral histogram can be obtained recursively as:

$$H(x)=H(x-1) \cup Q(f(x)) \quad (2)$$

using the initial condition $H(0)=0$, i.e., all of the bins of the histogram are empty initially.

Then, the histogram of a target region $T=[p^-, p^+]$, where $p^-<p^+$ determines the propagated integral histogram values at the bounding points of the region as:

$$h(T, b) = H(p^+, b) - \sum_{i \neq j}^{d} H([p_i^-, p_j^+], b) + (d-1)H(p^-, b), \quad (3)$$

which becomes $$h(T,b)=H(p^+_1,p^+_2,b)-H(p^-_1,p^+_2,b)-H(p^+_1,p^-_2,b)+H(p^-_1,p^-_2,b)$$

for a 2-D data set. Note that the region is bounded by $$p^-_1 \leq x_1 \leq p^+_1, \ldots, p^-_d \leq x_N \leq p^+_d.$$

As opposed to conventional histogram construction, the integral histogram method according to the invention does not repeat the histogram extraction for each possible region.

Figure 3:
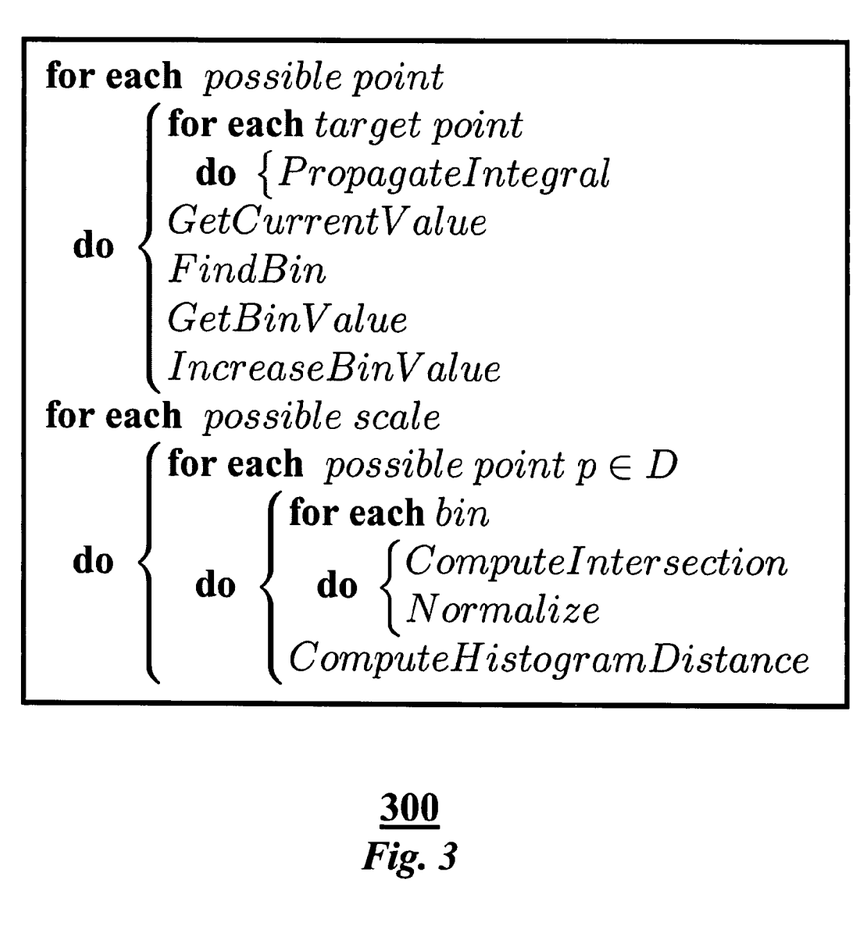
FIG. 3 is a pseudocode for a histogram extraction method according to the invention.

FIG. 3 shows the pseudocode 300 of a method for extracting an integral histogram from sampled data according to the invention.

For each possible point, and for each target point, get the current value, find the bin, and increase the bin value. Then, for each possible scale, for each possible point, and for each bin, compute the intersection with previous bins, normalize, and compute distances between histograms.

In case of a 2-D data, e.g., a $N_1 \times N_2$ gray level image, the parameters. are d=2, k=1, and the data space is limited within the vertical and horizontal image sizes $N_1$, $N_2$.

Figure 4:
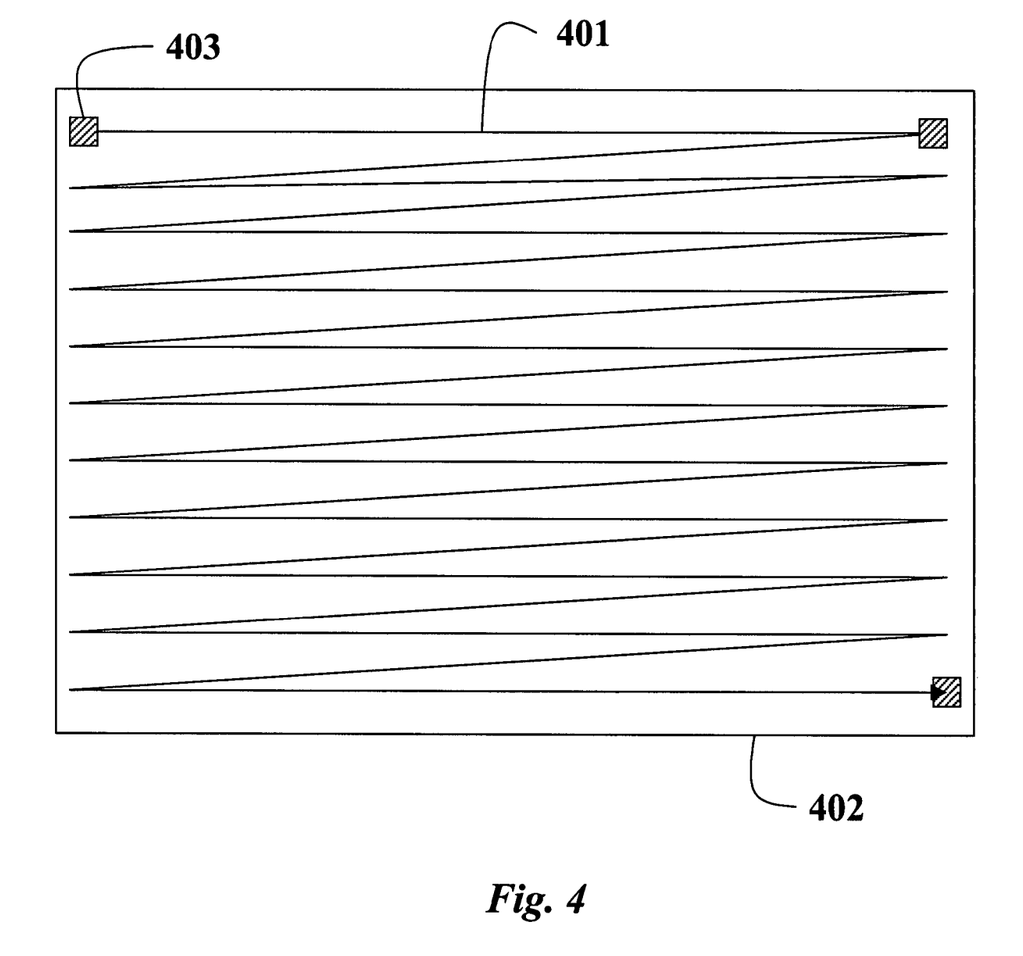
FIG. 4 is a block diagram of a scan line through pixels in an image.

As shown in FIG. 4, the scanline 401 for the image 402 can be assigned to pixels 403 in a left to right, and top to bottom order.

Figure 5:
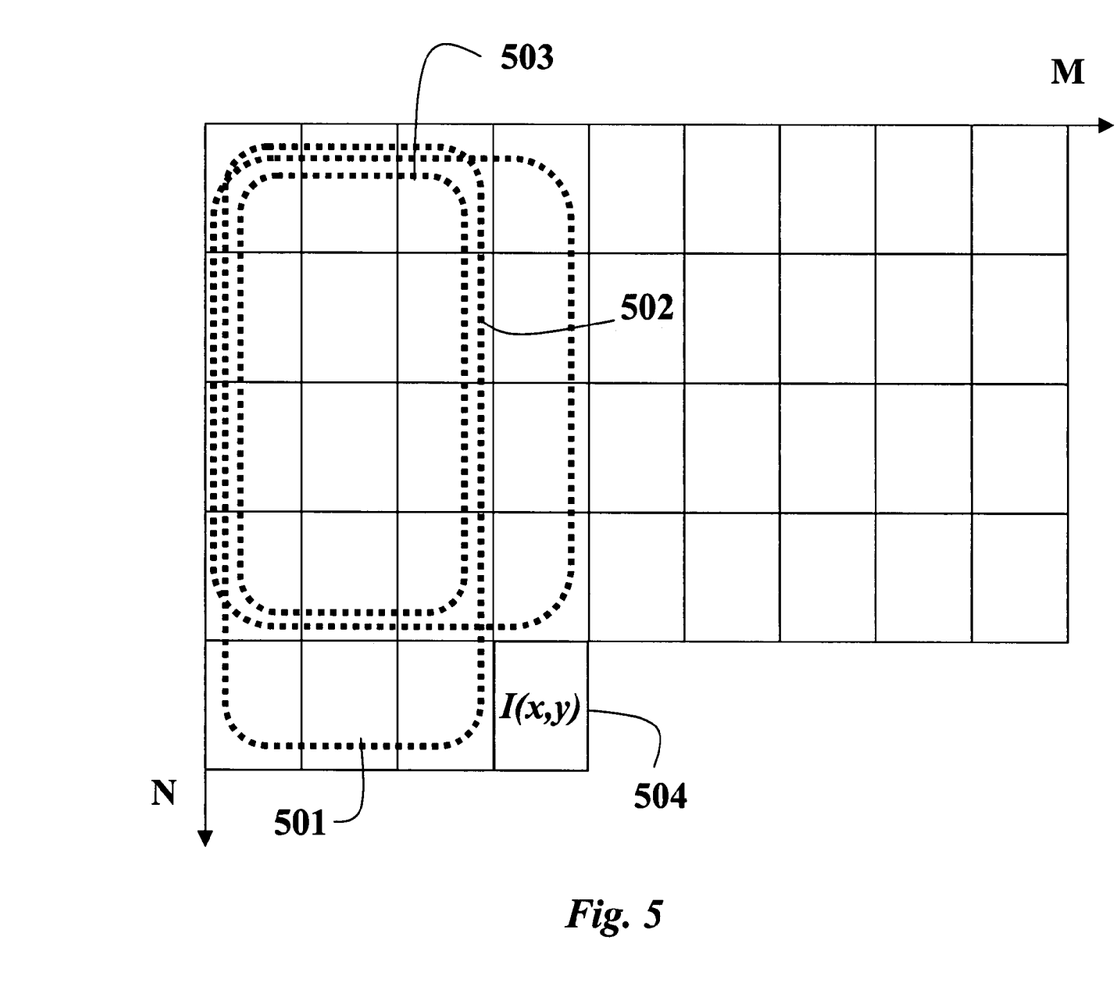
FIG. 5 is a block diagram of a recursive integral histogram construction.
Figure 6:
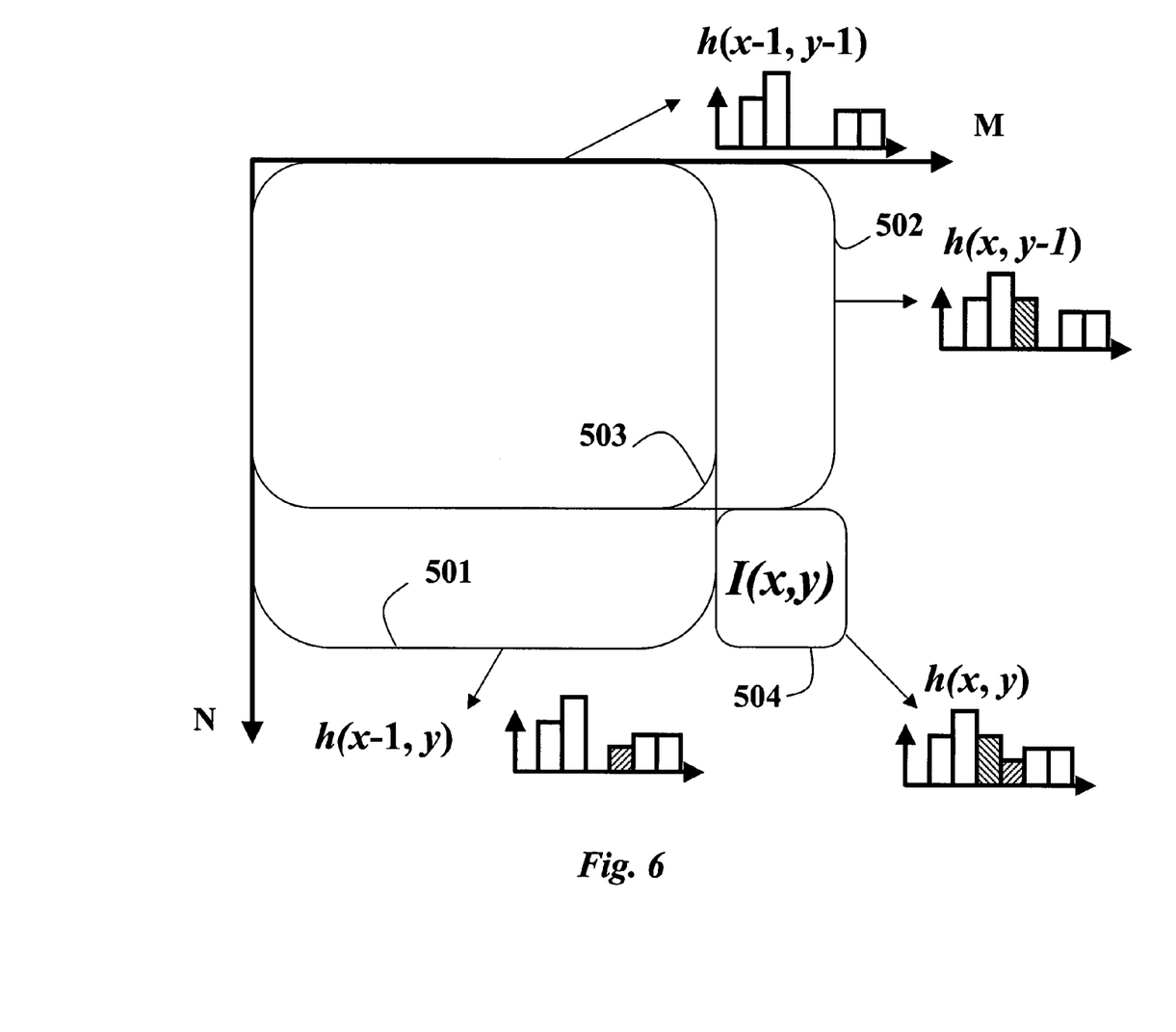
FIG. 6 is a block diagram of a recursive integral histogram construction.

As shown in FIGS. 5 and 6, the recursion can be expressed as:

$$H(x_1,x_2,b)=H(x_1-1,x_2,b)+H(x_1,x_2-1, b)-H(x_1-1,x_2-1, b)+Q(f(x_1,x_2))) \quad (4)$$

for all b=1, ..., B.

This propagation assigns the histogram bins of the current point by using an intersection of the bins of the three previous histograms 501-503, to the left, top, and upper-left, respectively, with an increment of the value of the bin that belongs to the current data point (pixel) I(x, y) 504.

The following sections analyze the computational cost of extracting the integral histogram when compared with conventional histograms. The analysis is included because the analysis dramatically shows that the integral histogram method is extremely superior to conventional histogram extraction methods.

Integer Data

In this case, the sampled input data is a d-dimensional array, wherein the range of values for each dimension is $N_d$ with associated k-dimensional tensors. The histograms are k-dimensional with B identical bins for each dimension. The bin size is an integer number. Furthermore, a target window for the histogram corresponds to a size of a target object, $M_1 \times \ldots \times M_d$.

Conventional histogram matching algorithm requires 7d−3+k operations to determine current values in the d-dimensional input tensor, 75k operations to determine the corresponding bin indices, and one operation to increase the bin value. Bin indices can be determined by a floating-point multiplication and then float-to-integer conversion. The cost of this option, (109k), is higher than the division itself (75k). After all the $M_1 \times \ldots \times M_d$ points in the target window have been processed, the histogram bins are normalized with the number of points, which requires $B^k$ floating point multiplications, thus $4B^k$ operations in terms of the relative cost. These operations are repeated for each of the $N_1 \times \ldots \times N_d$ histograms matches.

$$\left[ (7d+76k-2)\prod_j^d M_j + 4B^k \right] \prod_j^d N_j. \tag{5}$$

Note that, for different window size combinations $M_s = 1, \ldots, S_s$, where $S_s$ represents a maximum size of the range for the dimension s, the above process is repeated so that the total number of operations for the conventional method is $$\left[ (7d+76k-2)\prod_j^d M_j + 4B^k \right] \prod_i^d N_i \prod_s^d S_j. \tag{6}$$

The number of operations required for propagation with the integral histogram is $3(7k-3)+2k=23k-9$, in addition to the cost of getting the current value of the tensor values $(7d-3+k)$, finding the indices of the corresponding bin $(75k)$, and accumulating the obtained bin value, which is repeated for all points in the data space.

Then, the number of operations required to extract the histograms is $$[(7d+99k-11)]\prod_i^d N_i.$$

The histogram intersection uses $4(7k-3)+3k=31k-12$ operations. Normalizing the result uses $B^k$ floating point divisions, i.e., $4B^k$ operations, for each histogram. Then, the cost of all $N_1 \times \ldots \times N_d$ histograms and all possible search window dimension matches is only $$\left[ 7d+99k-11+(31k-12+4B^k)\prod_s^d S_s \right] \prod_i^d N_i. \tag{7}$$

A ratio of the computational load of the conventional approach versus the integral histogram method is $$r = \frac{\left[ (7d+76k-2)\prod_j^d M_j + 4B^k \right] \prod_s^d S_s}{7d+99k-11+(31k-12+4B^k)\prod_s^d S_s}. \tag{8}$$

Floating Point Data

Floating point data increases the number of operations for each division for each point from 75k to 100k. The bin value increment cost becomes four, which was one before. The total cost for the conventional approach becomes:

$$\left[ (7d+101k+1)\prod_j^d M_j + 4B^k \right] \prod_i^d N_i \prod_s^d S_s. \tag{9}$$

For the integral histogram method, the complexity of the step for finding bin indices increases to 100k. In the propa-gation stage, the cost of additions increases from 2k to 8k. In the intersection computation, the cost becomes:

$$\left[ 7d+130k-11(40k-12+4B^k)\prod_s^d S_s \right] \prod_i^d N_i. \tag{10}$$

Power-of-Two Bin Sizes

Note that optimization is possible by using a bin size that is a power of two. Using bit-wise shift operator, a division operator can be achieved at a fraction of the cost. For instance, instead of dividing by 64, the number can be shifted six bits to the right. The computation of the bin indices drops from 75k to 2k, on average and depending the number of bit shifts. Then, the total number of operations for integer data using the conventional approach becomes $$\left[ (7d+3k-2)\prod_j^d M_j + 4B^k \right] \prod_i^d N_i \prod_s^d S_s. \tag{11}$$

For the integral histogram with bin sizes that are powers of two, the total cost drops to $$\left[ 31k+7d+1+(43k+1+100B^k)\prod_s^d S_s \right] \prod_i^d N_i. \tag{12}$$

Matching Without Normalization

For some applications, the target object is searched in its original size without scaling, or with scaling factors of half sizes that correspond to down-sampling by powers of two, i.e., half size, quarter size, etc. In such cases, further computational reduction is possible because no histogram normalization is needed for the same size matches, and significant reduction is achieved for smaller half-sizes because the division can be done using bit-wise right shift operator. For a scaling factor of $2^{-s}$, where $s=0$ stand for no scaling, $s \leq 1$ for downsizing, the necessary computations of the conventional approach with integer data becomes $$\left[ (7d+35k+4)\prod_j^d M_j + 5(1-\delta(s))B^k \right] \prod_i^d N_i. \tag{13}$$

The cost for the integral histogram becomes $$\left[ 7d+26k-11+(31k-12+4B^k)\prod_s^d S_s \right] \prod_i^d N_i. \tag{14}$$

Note that, in addition to the above costs, the conventional approach has another important disadvantage. After each computation, the histogram array values are initialized anew. This creates additional overhead.

Applications

Time Series Data

For 1D-sampled data, such as a time series of an audio signal with a length M and a histogram having a total bin number B, and a target size range up to S data points, the parameters of the above analysis become d=1 and k=1. The ratio becomes $$r_1 = \frac{(81M + 4B)S}{95 + (19 + 4B)S}. \quad (15)$$

Surprisingly, the integral histogram improves the processing time of time series sampled data up to the $3.5 \times 10^4$ times over the conventional method. For instance, a common task that requires searching time series data that contains $10^4$ points with a 32-bins histogram is 3,347 times faster than the conventional method.

Gray Level Images

For a $M_1 \times M_2$ gray level image and a search window size range $S_1$, $S_2$, the parameters of the above analysis become d=2 and k=1, and the ratio is $$r_2 = \frac{[88M_1M_2 + 4B]S_1S_2}{102 + (50 + 4B)S_1S_2}. \quad (16)$$

Two-dimensional data is very common in vision applications that use gray-level surveillance videos and monochrome aerial imagery. For example, the problem is to find a 64×64 target pattern at three different hierarchical resolutions, e.g., 64×64, 32×32, and 16×16, using a 16-bins histogram. The method according to the invention finds the target pattern 2,435 times faster. With other optimizations as described above, the entire process can speed up by a factor of $6 \times 10^4$ compared to the conventional method.

Color Images

For a color image with a 3D histogram, where each point has three color values in a tensor form, the parameters become d=2 and k=3. If the search is with a template window size of $S_1$, $S_2$ in image dimensions, the ratio is:

$$r_3 = \frac{[240M_1M_2 + 4B^3]S_1S_2}{300 + (81 + 4B^3)S_1S_2}. \quad (17)$$

Even for a regular model matching task that searches a 100×100 object models at twenty scales using histograms for each color channel coded in four bits, i.e., sixteen bins, the process is accelerated 146 times. The savings can go up to $7 \times 10^5$ depending on the number of bins and target size.

Volumetric Data

For volumetric data, the parameters are d=3 and k=1. Searching in higher dimensional spaces is essential in feature selection and classification problems. The corresponding ratio is $$r_4 = \frac{[95M_1M_2M_3 + 4B]S_1S_2S_3}{109 + (81 + 4B)S_1S_2S_3}. \quad (18)$$

The integral histogram method becomes much more advantageous in higher dimensions. The savings can reach up to $15 \times 10^7$. For searching a $10^3 \times 10^3 \times 10^3$ target volume searched in its original size (S=1) using a 100-bins histogram, the invention can achieve an amazing $1.6 \times 10^8$ times improvement.

Object Detection

Figure 7:
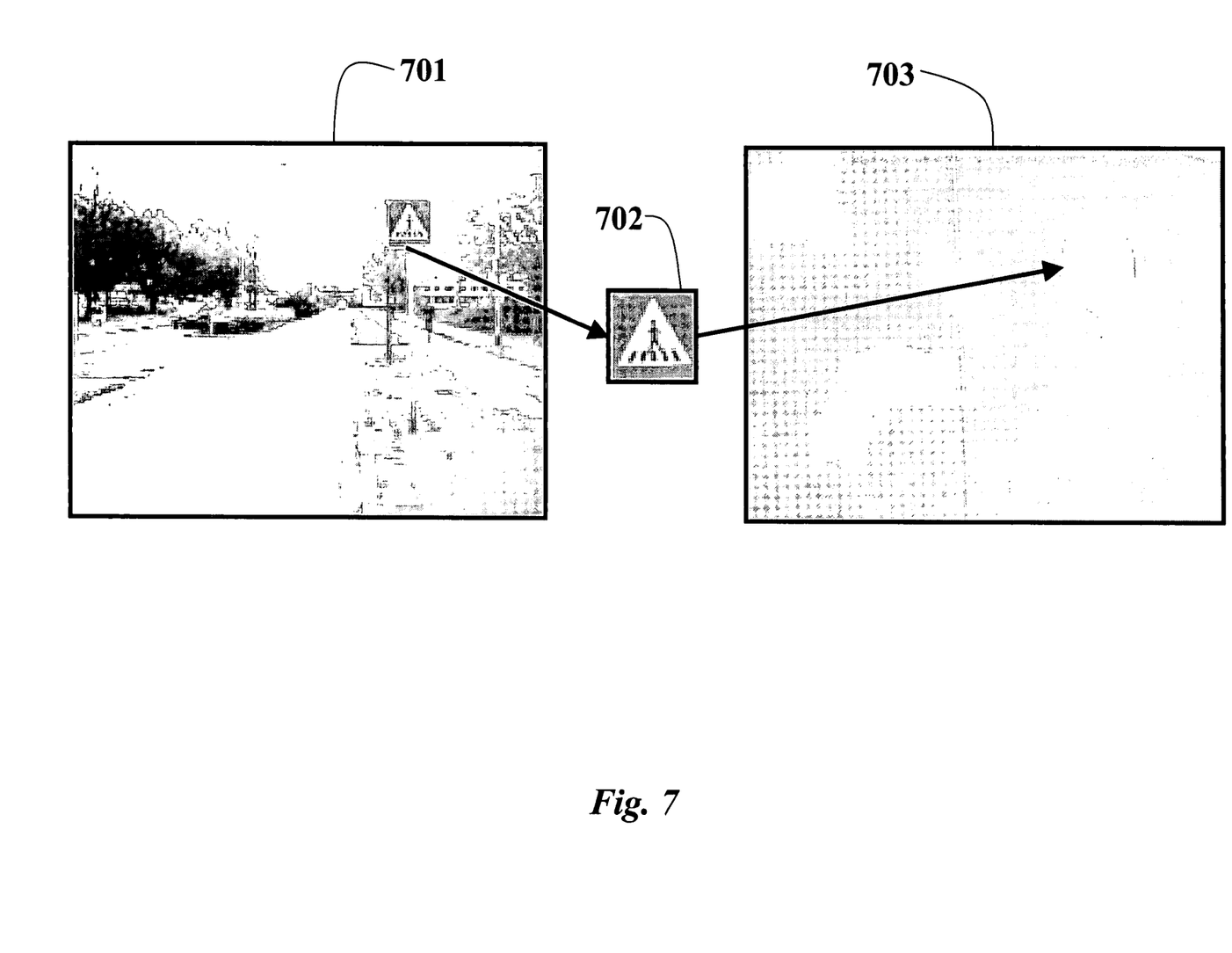
FIG. 7 is a diagram of mapping a target traffic sign in an input image to a similarity map.

As shown in FIG. 7, an object detection application takes as input an image 701. The target is a traffic sign 702. The search for the target object uses a 15-bins color histogram for each channel. The integral histogram is used to construct a similar similarity map 703, which is similar to a conventional similarity map. However, the integral histogram method runs in 63 msecs, while the conventional method requires two minutes on a conventional 3.2 Ghz processor, an almost 2000 times improvement.

Texture Detection

Figure 8:
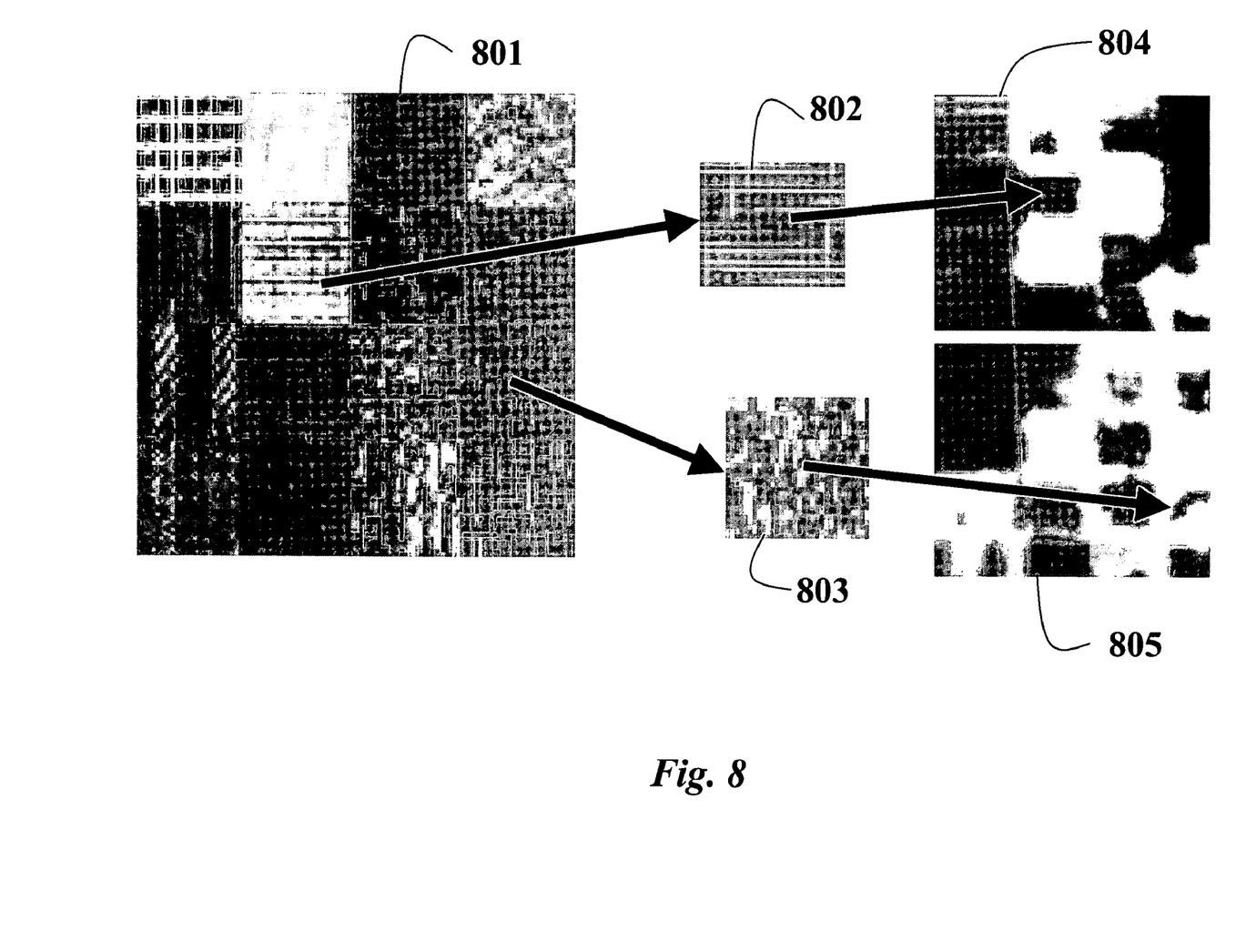
FIG. 8 is a diagram of mapping textures in an input image to similarity maps.

As shown in FIG. 8, the integral histogram method can also be used for a texture detection application. This application takes as input an image of textures 801. The task is to detect textures 802 and 803. The detected textures are shown in the corresponding similarity maps 804 and 805. The integral histogram has 24-bins histogram of gradient orientations. The integral histogram method takes 88 msecs and the conventional method requires more than five minutes of processing time, an increase by a factor of 3400. Note that even such a simple histogram provides sufficient information for texture segmentation. It is also possible to combine histograms to define higher level features such as Haar wavelets.

We determine pixel-wise texture features and construct tensors for image data. Each tensor is a vector that includes corresponding texture components such as gradient magnitude, orientation, color, and edge, as well as other image filter responses such as Gabor filters, discrete Fourier, and cosine transform coefficients.

We determine a histogram of texture using the tensors. For instance, if we have k different texture components, then our tensor is a [1×k] tensor. Each element in the tensor indicates the value of the corresponding texture feature for the current pixel. We also specify quantization steps for each element in the sensor such as $K_1, K_2, \ldots, K_d$ for the $1^{st}, 2^{nd}, \ldots, d^{th}$ features, where d can be a large positive integer. The integral histogram then is $K_1 \times K_2 \times \ldots \times K_d$. The construction of such a higher dimensional histogram for each target region/data range using the conventional method requires exponential time, which is prohibitive for most texture detection applications. However, integral histogram method provides higher reduction in computational load especially as the dimensionality of the data increases.

Higher Level Features

Figure 10:
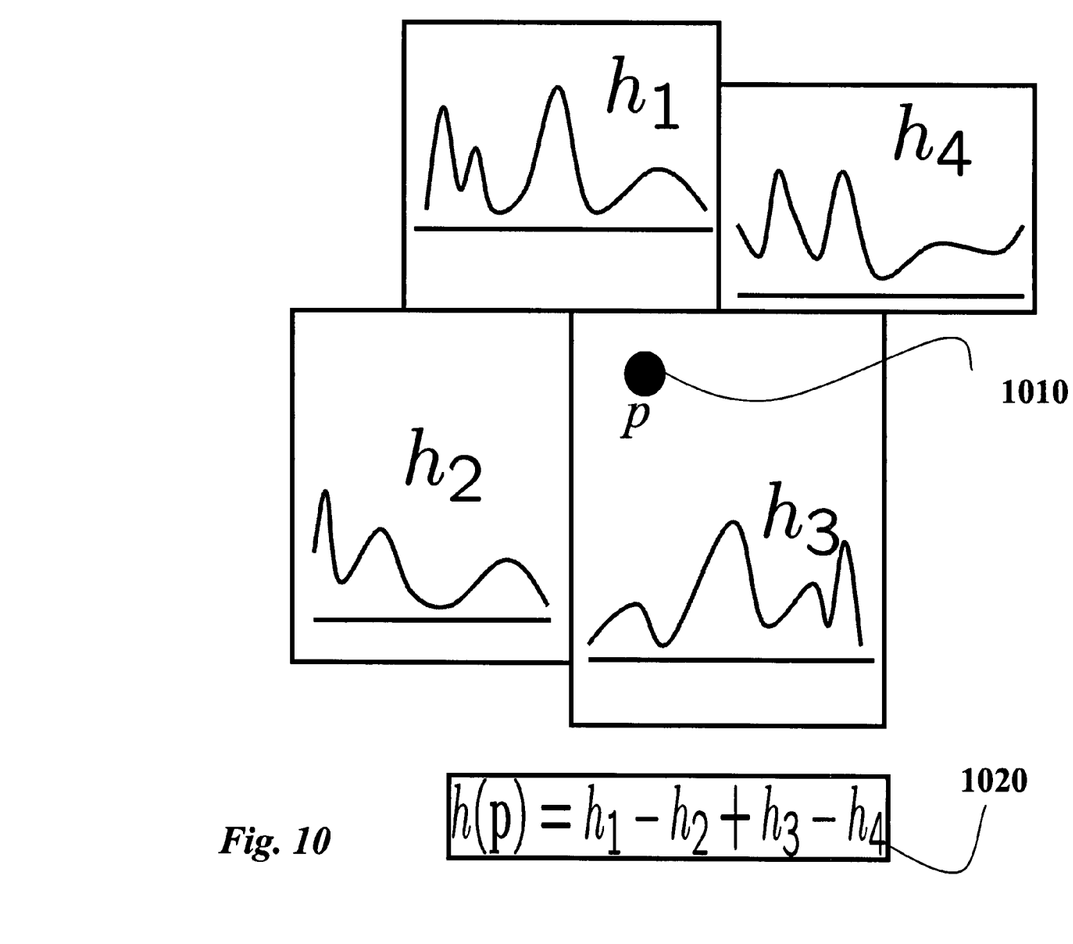
FIG. 10 is a block diagram of spatial combinations of integral histograms according to the invention.
Figure 11:
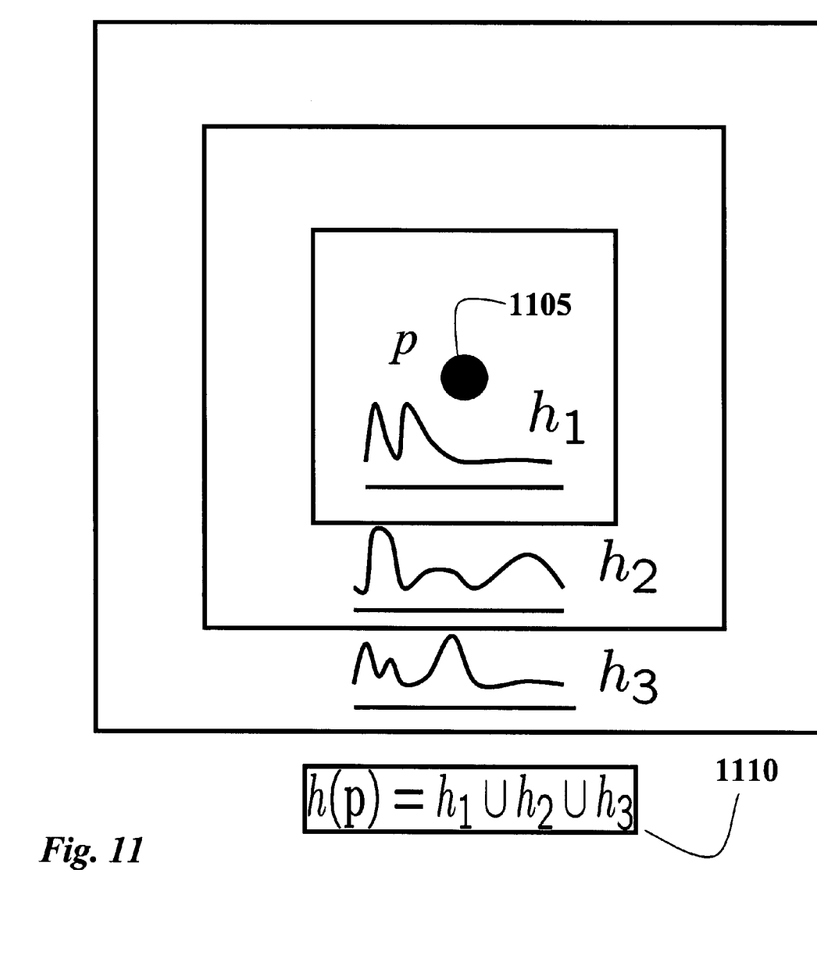
FIG. 11 is a block diagram of hierarchical combinations of integral histograms according to the invention.
Figure 12:
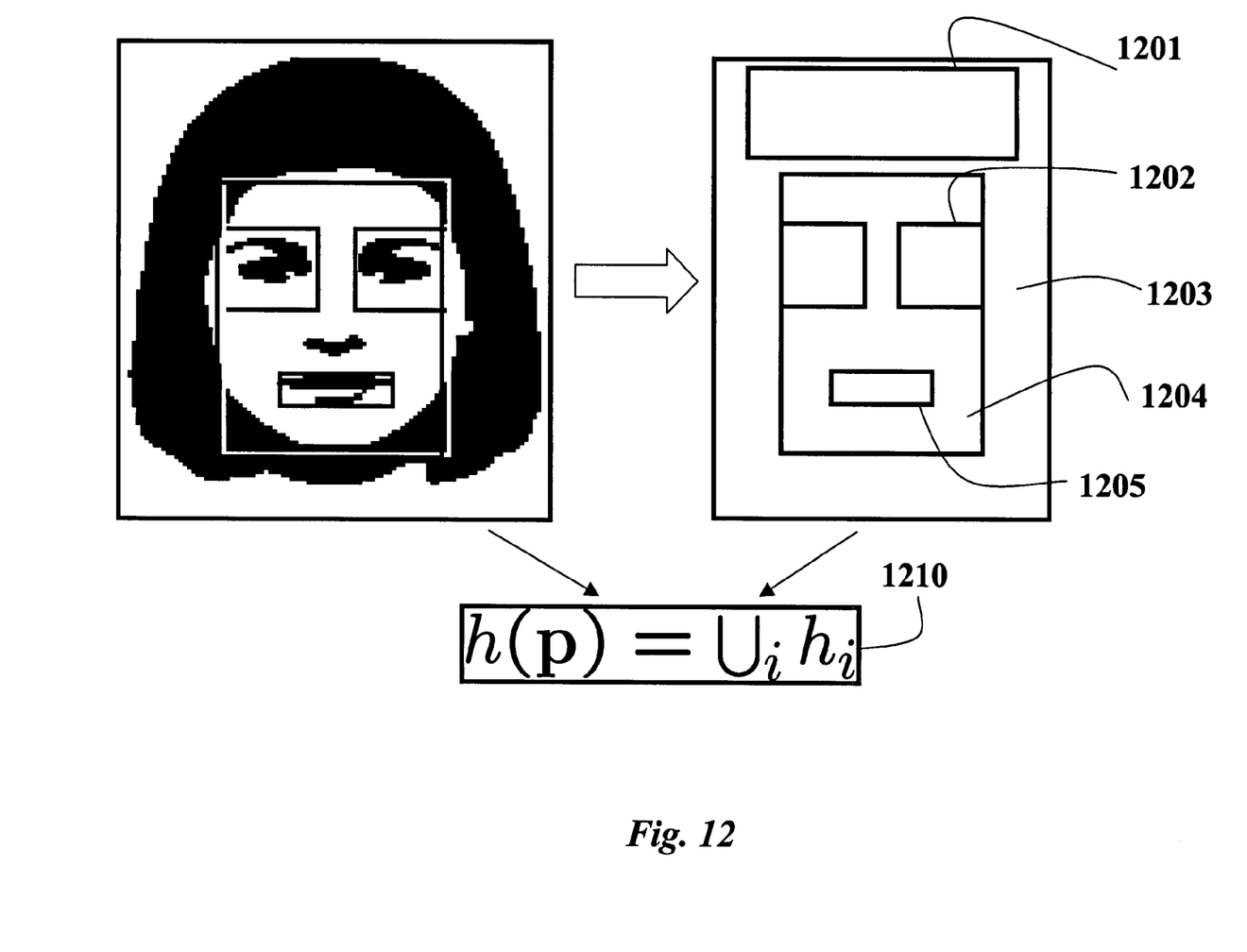
FIG. 12 is a block diagram of model-based combinations of integral histograms according to the invention.

As shown in FIGS. 10-12, higher level features can easily be determined using spatial, hierarchical, and model-based combinations of the integral histogram according to the invention.

FIG. 10 shows a spatial combination of histograms $h_1$, $h_2$, $h_3$, and $h_4$ around a center point p 1010. The combined histogram h(p) 1020 is given by $(h_1 - h_2 + h_3 - h_4)$. The higher level features are constructed by summation or subtraction of corresponding histograms of regions in an image.

FIG. 11 shows a hierarchical combination of histograms $h_1$, $h_2$, and $h_3$ centered at a point p 1105. Instead of constructing a histogram on a single scale, the higher level features are constructed from multiple histograms within different concentric regions. The histograms are combined to form an aggregated histogram according to h(p) 1110 which is $h_1 \cup h_2 \cup h_3$, to capture multi-scale properties of the underlying data distribution.

FIG. 12 shows a model-based combination of histograms for a face that includes hair color 1201, eye color 1202, face texture 1203, skin color 1204, and lip color 1205. The combined histogram h(p) 1210 is $\cup_i h_i$.

These combinations of enable integration of spatial information as well as the distribution of the data values.

Tracking Examples

Figure 9:
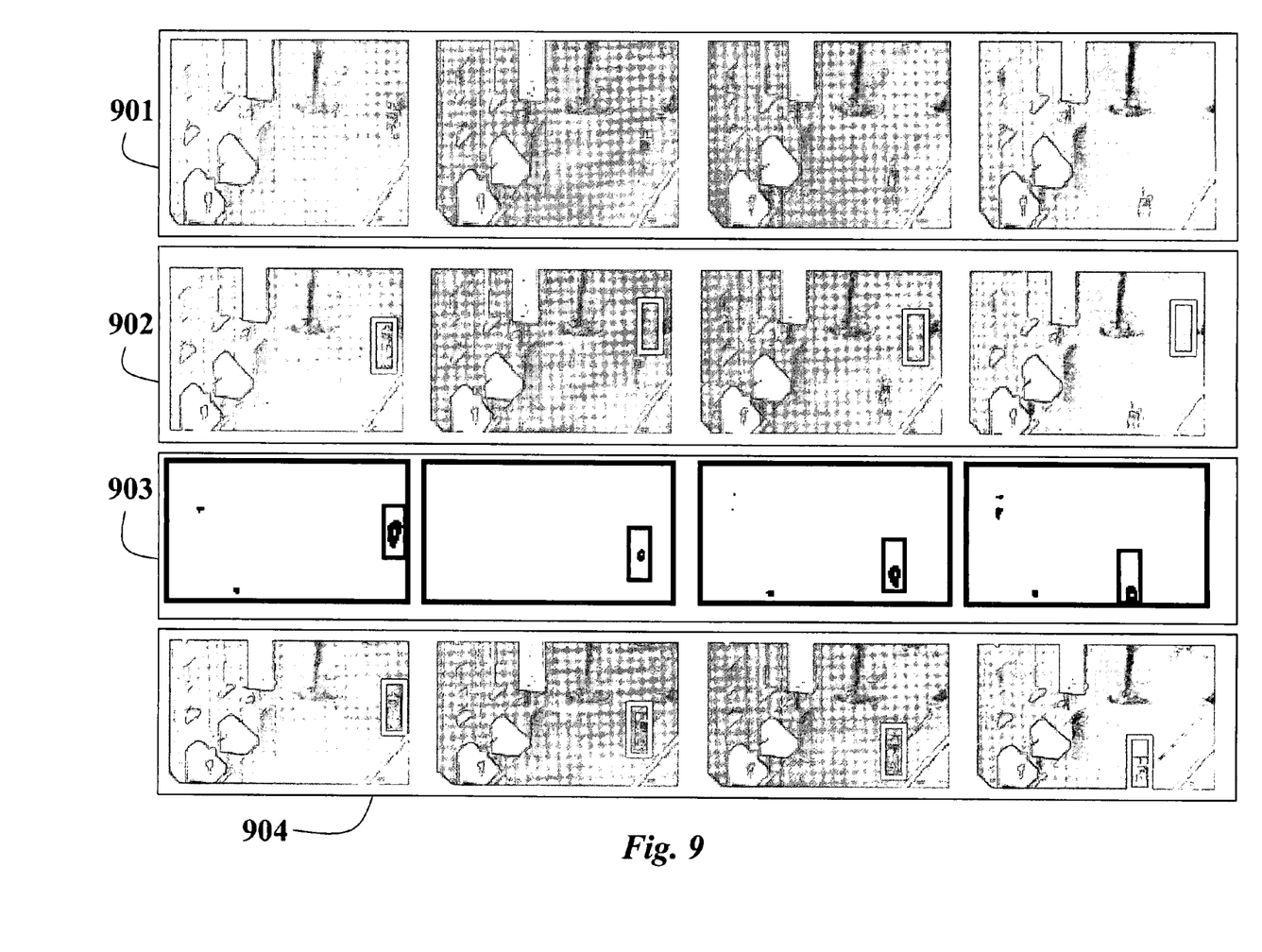
FIG. 9 compares object tracking in videos using conventional mean-shift object tracking and tracking with the integral histogram method according to the invention.

FIG. 9 compares the integral histogram method with a conventional histogram method for tracking objects in an input video, e.g., a pedestrian in a street scene. The input is a sequence of frames 901. The sequence 902 shows the result of conventional mean-shift tracking. Note that the conventional method fails to track the pedestrian, and instead tracks a stationary shadow. The sequence 903 shows the tracked object, as correctly tracked in the sequence 904 using the integral histogram method.

After initialization of an object, the color histogram similarity scores between the original histogram and the histograms of the object windows centered on every pixels are determined. Note that, such a similarity determination is very slow using the conventional method. The integral histogram method is compared with a gradient descent based method known as mean-shift, see Comaniciu et al., above.

The mean-shift method evaluates the histogram similarity, in most cases using a Bhattacharya distance, only within its original kernel, that is the window of the object. The mean-shift iterations uses 16-bins histograms for each color channel. However, the mean-shift only evaluates similarity within a limited search region. As a result, for the cases in which object relocation is large between frames, and there is no overlap between the object windows in the consecutive frames, it is bound to fail, as shown in the sequence 902.

The integral histogram enables one to determine similarities over the entire image plane in a relatively constant small amount of time, e.g., 55 msecs. Thus, with the integral histogram method it is now possible to track the objects accurately at high frame rates.

EFFECT OF THE INVENTION

The invention provides a computationally efficient method for extracting and searching histograms of all possible regions in a Cartesian space. The integral histogram provides an optimum and complete solution for histogram-based applications.

The integral histogram method can expedite the search process more than thousands of times in comparison to conventional methods.

The method can be extended to any dimensional data space and any tensor representations.

In addition, the method enables the construction of advanced histogram features for further feature selection and classification purposes.

Many computer vision applications, such as video object detection and tracking, where the real-time requirement have been a bottleneck up to now, can benefit from the integral histogram method.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A computer implemented method for extracting an integral histogram from sampled data, comprising:

acquiring a set of samples from a real-world signal;

scanning the set of samples in a predetermined order; and constructing, for each current sample, an integral histogram, the integral histogram integrating a histogram of the current sample and the integral histograms of previously scanned samples.

2. The method of claim 1, in which the scanning is in a left to right and then a top to bottom order.

3. The method of claim 1, in which the set of samples is a d-dimensional array, and in which a range of values for each dimension is $N_d$ with associated k-dimensional tensors.

4. The method of claim 1, in which the integral histogram includes a plurality of bins, and a size of each bin is an integer number.

5. The method of claim 4, in which the size is a power of two.

6. The method of claim 1, in which the set of samples is a one-dimensional time series.

7. The method of claim 1, in which the set of samples is a two-dimensional gray-level image.

8. The method of claim 7, in which the similarity map is used to detect textures in the image.

9. The method of claim 1, in which the set of samples is a color image.

10. The method of claim 1, in which the set of samples is volumetric data.

11. The method of claim 1, in which the set of samples is a video, and further comprising:

constructing a similarity map from the integral histogram.

12. The method of claim 11, in which the similarity map is used to detect an object in the image.

13. The method of claim 1, further comprising:

combining the integral histogram spatially.

14. The method of claim 1, further comprising:

combining the integral histogram hierarchally.

15. The method of claim 1, further comprising:

combining the integral histogram according to a model.

16. The method of claim 1, in which the set of samples is an image, and further comprising:

specifying target regions in the image according to corner points in a Cartesian space;

determining the integral histogram for the target regions; and normalizing the integral histogram with respect to a size of the target regions in the image to obtain a normalized histogram.

17. The method of claim 1, further comprising:

adding bin values of the integral histogram of a lower-right corner point that correspond to a largest target region in the image to bin values of the integral histogram of an upper-left corner point in the image that correspond to a smallest target region, and subtracting the bin values of the upper-right and lower-left corner point integral histograms.

18. The method of claim 17, further comprising:

determining a distance between the normalized histogram and the integral histograms of the target regions.

19. The method of claim 1, in which the set of samples is an image, and further comprising:

constructing higher-level features by combining the integral histograms of intensity, color, texture, gradient, motion, orientation, template matching, and image filter responses of the image.

* * * * *